United States Patent [19]

Vedvig

[11] 4,180,965
[45] Jan. 1, 1980

[54] TOBACCO HARVESTER

[76] Inventor: Matt Vedvig, Rte. 1, 979 County Trunk A, Edgerton, Wis. 53534

[21] Appl. No.: 934,043

[22] Filed: Aug. 16, 1978

[51] Int. Cl.² ............................................ A01D 45/16
[52] U.S. Cl. .................................................... 56/27.5
[58] Field of Search ............................ 56/27.5, 327 R

[56] References Cited

U.S. PATENT DOCUMENTS

| | | | |
|---|---|---|---|
| 1,090,747 | 3/1914 | Nunnelley et al. | 56/27.5 |
| 2,477,068 | 7/1949 | LaMotte | 56/27.5 |
| 2,813,390 | 11/1957 | Irvine | 56/27.5 |
| 2,923,116 | 2/1960 | Brown | 56/27.5 |
| 3,902,607 | 9/1975 | Middleton | 56/27.5 |
| 4,037,392 | 7/1977 | Taylor et al. | 56/27.5 |

*Primary Examiner*—Russell R. Kinsey
*Attorney, Agent, or Firm*—Andrus, Sceales, Starke & Sawall

[57] ABSTRACT

A tobacco harvester consisting of a mobile machine having a frame on wheels and which at the forward end supports rotary overlapping cutters adjacent the ground for cutting tobacco plants which are then deposited in a trough-like conveyor system consisting of a central conveyor and slanted side conveyors which are driven at a faster speed than the central conveyor to eliminate injury to the plants. The machine, cutters and conveyors are hydraulic driven from separate hydraulic motors actuated by a gasoline engine. The cut tobacco plants are carried rearwardly by the conveyor and manually hung individually on a lath which is located in a supporting shuttle assembly of bowed construction and then pushed rearwardly which brings forward another lath ready to be loaded with newly cut tobacco plants. Because of the bowed construction of the shuttle the laths pass without injuring the tobacco leaves.

7 Claims, 7 Drawing Figures

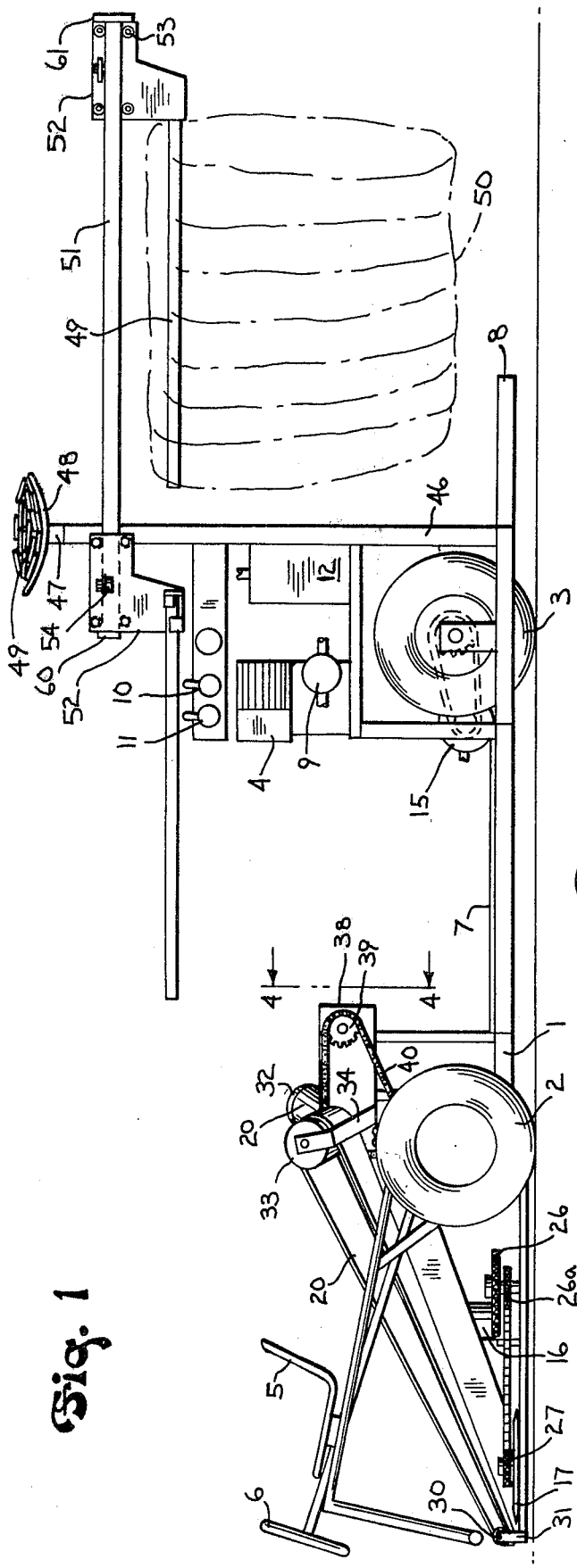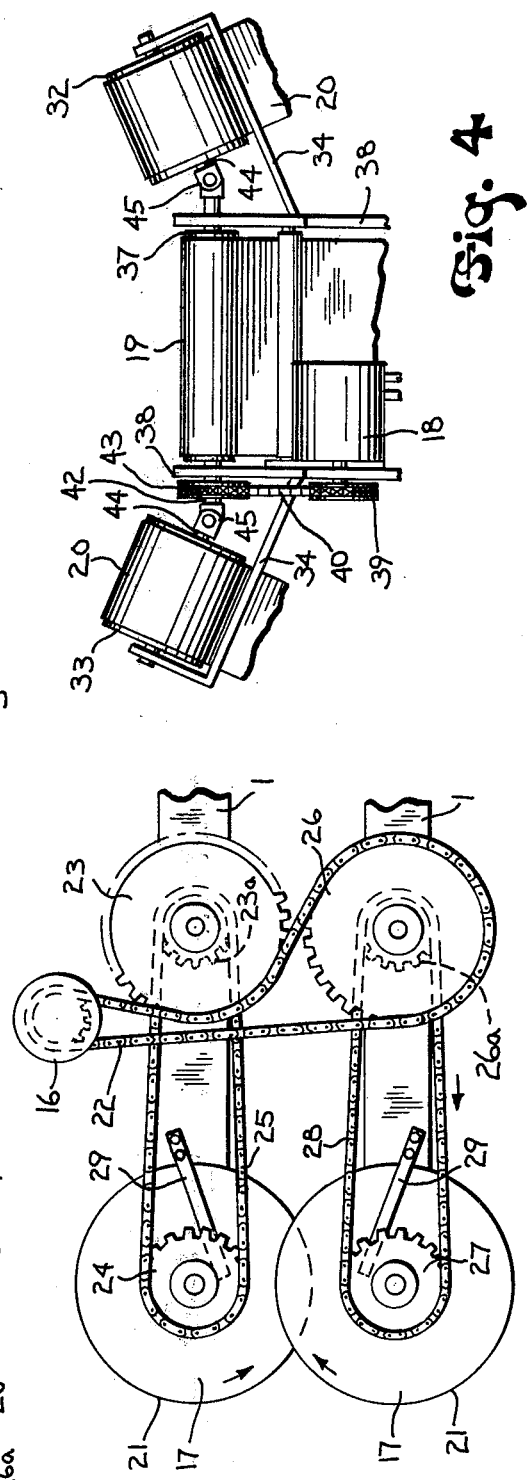

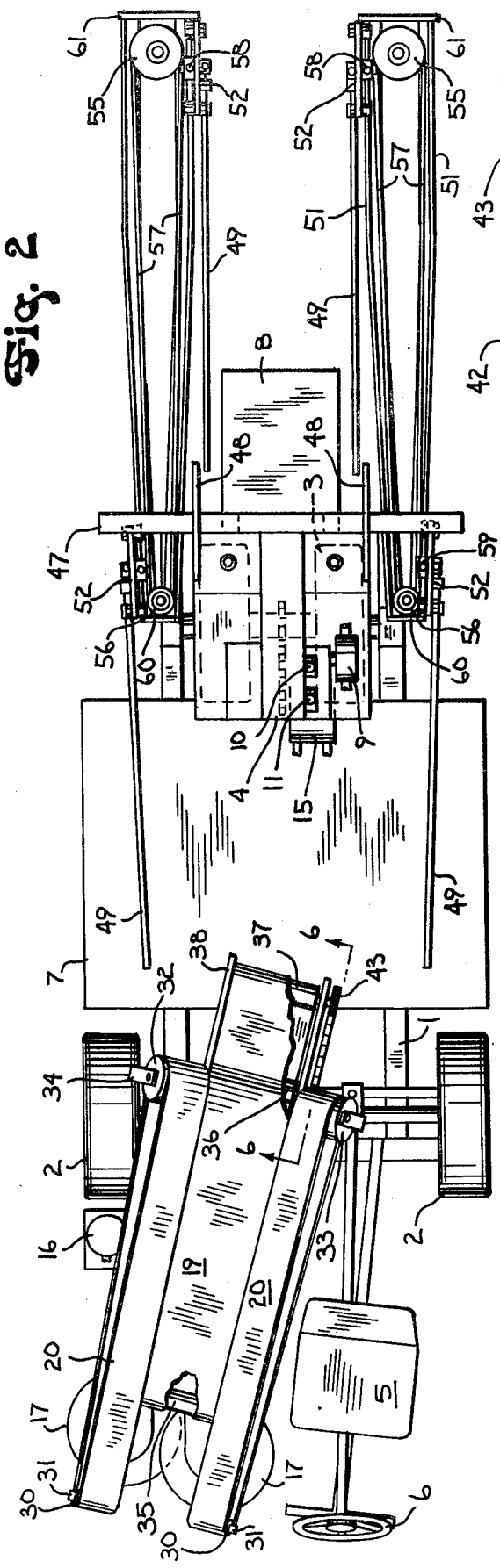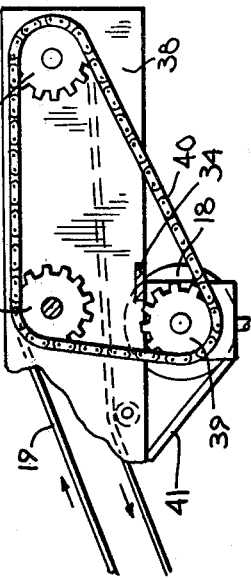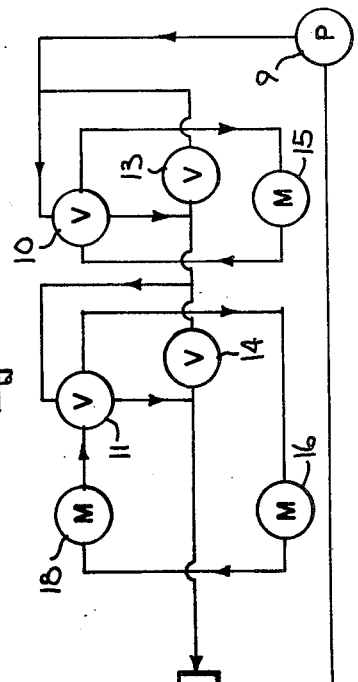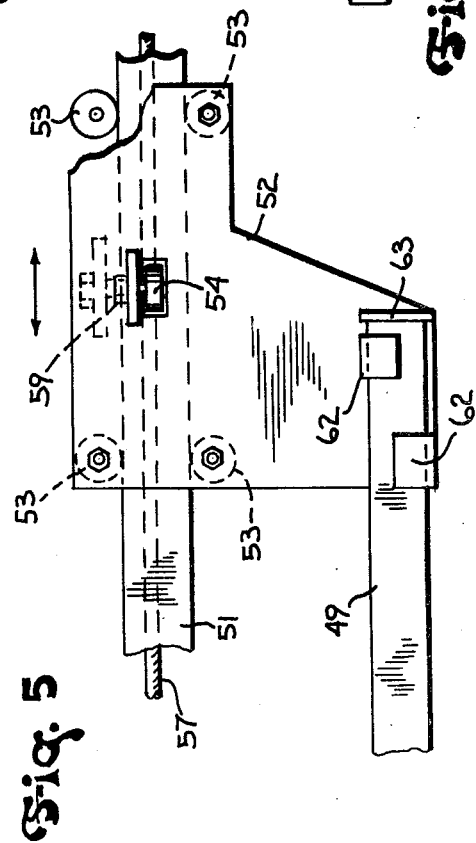

TOBACCO HARVESTER

BACKGROUND OF THE INVENTION

The invention is directed to a versatile, easily operated machine supported on wheels for movement along a row of tobacco plants to cut the plants and convey them without injury to a position on the machine where they may be loaded onto a lath shuttle assembly for drying. The cutting and conveying assembly prevents injury to the leaves of the plants and the bowed construction of the lath shuttle assembly and location of the rear wheels prevents injury to the leaves of the plants as they are conveyed rearwardly.

SUMMARY OF THE INVENTION

The invention is directed to a machine for harvesting tobacco which has a frame supported on wheels driven by a gasoline engine along a row of tobacco plants. The machine has a hydraulic system operated by the engine which actuates a hydraulic motor which drives the rear wheels of the machine. The engine also drives a second hydraulic motor which rotates a pair of cutters at the front of the machine located adjacent the seat for the driver of the harvester. A third hydraulic motor actuated by the engine drives a set of three conveyors which receives the cut tobacco plants and transports them rearwardly of the machine. To prevent injury to the plants, the conveyors are in the form of a trough with a generally large central conveyor and smaller side conveyors located on an upward slant relative to the central conveyor and which are driven at a faster speed than the central conveyor.

The rear portion of the machine is provided with a lath shuttle assembly consisting of a pulley and bracket arrangement in which a lath is manually loaded with the tobacco plants, is placed in the bracket and then pushed rearwardly for unloading. This simultaneously moves another lath forwardly to receive freshly cut tobacco plants. The supporting members of the shuttle are bowed so that the laths can pass without injurying the leaves of the tobacco loaded onto one of the laths.

BRIEF DESCRIPTION OF THE DRAWINGS

FIG. 1 is a side elevational view of the tobacco harvesting machine with parts in section;

FIG. 2 is a top plan view of the machine of FIG. 1 with parts in section;

FIG. 3 is a detail view illustrating the drive of the cutters at the forward end of the machine;

FIG. 4 is a schematic view illustrating the universal joint for the drive of the rollers of the side conveyors and the hydraulic motor for driving the conveyors with the side rollers projected outwardly of their normal position to better illustrate the universal joints;

FIG. 5 is a detail enlarged side view illustrating the lath loading bracket of the assembly;

FIG. 6 is a detail view illustrating the drive of the central conveyor; and

FIG. 7 is a diagrammatic view of the network of the hydraulic system.

DETAILED DESCRIPTION OF THE PREFERRED EMBODIMENTS

Referring to the drawings, there is shown in FIGS. 1 and 2 a machine for harvesting tobacco which has the frame 1 supported on the front wheels 2 and rear wheels 3 for movement along a row of tobacco plants.

The rear wheels 3 are located laterally inwardly of the front wheels and driven from a hydraulic system actuated by a gasoline engine 4 located above the rear wheels 2. A seat 5 is secured to the forward end of the frame 1 upon which the driver of the machine sits and controls the direction of travel of the front wheels 2 by the steering wheel 6. Frame 1 also supports a central platform 7 for workers who receive the cut tobacco plants and load them to the rear of the central platform, and a platform 8 at the rear of frame 1 also supports another worker for unloading the plants from the machine.

The machine has a self-contained hydraulic system which as illustrated in FIG. 6 consists of a pump 9 driven by engine 4, control valves 10 and 11, a hydraulic oil reservoir 12, flow control valves 13 and 14, a first hydraulic motor 15 to drive rear wheels 3 from engine 4, a second hydraulic motor 16 to drive the cutters 17 at the front of the machine, hydraulic motor 18 to drive a wide central conveyor 19 and side conveyors 20 located at the forward end of the machine and the requisite tubing for carrying the hydraulic fluid to the various components of the system.

The hydraulic system is actuated by the operator through control valves 10 and 11 which open and close passages in the piping system to control the flow of hydraulic fluid through the system. The right-hand control valve 10 controls flow of fluid to hydraulic motor 15 to drive rear wheels 3. The left-hand control valve 11 controls the flow of fluid to hydraulic motor 15 to rotate cutters 17 and to hydraulic motor 18 to drive the central conveyor 19 and side conveyors 20. The fluid in the system is metered through the flow control valve 13 to control the ground speed of the machine and through control valve 14 to control the speed of cutters 17 and the respective conveyors 19 and 20.

The cutters 17 located at the forward end of the machine in a low horizontal plane just above ground level are offset from the center of the machine so that they will move into contact with the tobacco plants to be cut which are located to one side of the machine, in this case the right side.

FIG. 3 illustrates the drive of the cutters 17 which are of disc shape and provided with a plurality of sharp knifelike edges 21. As shown in FIGS. 2 and 3, cutters 17 overlap slightly at their inner portions as they rotate. Cutters 17 are independently driven from hydraulic motor 16 through a sprocket and chain train consisting of a drive chain 22 encircling a sprocket driven by motor 16 and engaging large sprocket 23 rotatably connected to frame 1 and secured to the small sprocket 23a to drive the latter and which is connected to the small sprocket 24 by chain 25 secured to one of the cutters 17 rotated from sprocket 23a through chain 25. Drive chain 22 also drives large sprocket 26 rotatably connected to frame 1 and secured to the small sprocket 26a to drive the latter and which is connected to the small sprocket 27 secured to the other cutter 17 by the chain 28 which then rotates that cutter 17 from sprocket 26a. The described sprocket and chain arrangement prevents clogging of the chains with plants, dirt and other foreign material. In addition wiper blades 29 are affixed to frame 1 and overlie cutters 17 to wipe off accumulation of dirt and foreign matter between cutters 17 and their respective drive gears 24 and 27 as cutters 17 rotate.

As the tobacco plants are cut they are conveyed upwardly by the conveyor assembly.

The conveyor assembly has a central conveyor 19 with a wide reach and two side conveyors 20 having reaches of considerably lesser width. Side conveyors 20 slant downwardly to the central conveyor 19 and slightly overlap the latter to form a trough-like conveyor assembly and at the lower end the reach of conveyors 20 extend a considerable distance forwardly of central conveyor 19 over cutters 17.

The side conveyors 20 at the lower ends of each reach encircle an angularly located idler roller 30 which rotates on a shaft affixed to bracket 31 which is secured to the forward end portion of frame 1. At the upper end the reach of one side conveyor 20 encircles the roller 32 from which the side conveyor is driven and the reach of the other side conveyor 20 encircles the roller 33 from which it is driven. Rollers 32 and 33 are supported on brackets 34 which are connected to frame 1.

An idler roller 35 as shown in FIG. 2 is rotatably connected to frame 1 at the lower end of central conveyor 19 and is encircled by the reach of conveyor 19.

At the upper end of the conveyors the reach of central conveyor 19 passes over roller 36 and encircles the elongated driving roll 37, both of which are located inside of conveyor frame 38 and longitudinally spaced from each other.

The rollers 36 and 37 are rotated from sprocket 39 which is driven by the hydraulic motor 18 through a chain 40. Sprocket 39 and motor 18 are located outside of conveyor frame 38 and are secured to frame 1 by the brace 41. The drive chain 40 initially extends around gear 42 for driving the shaft of roller 36 and then extends rearwardly to encircle sprocket 43 for driving the shaft of roller 37 and then returns to sprocket 39 on hydraulic motor 18. The reach of central conveyor 19 is driven by rollers 36 and 37 as it passes over them and is changed from an upward extent to a horizontal extent as it passes over the forward roller 36. Motor 18 and sprocket 39 which is supported from frame 1 by brace 41 thus rotates chain 40 and rollers 36 and 37 through their respective sprockets 42 and 43 as the latter are driven by chain 40.

The respective rollers 32 and 33 which side conveyors 20 encircle are located at an angle with respect to the reach of central conveyor 19 and are each connected to shafts 44 of rollers 32 and 33 by a universal joint 45 so that they can be driven from shafts 44.

It has been found that in order to properly orient and carry the leaves of the tobacco plants upwardly without injury by the respective conveyors for discharge rearwardly it is necessary to have the side conveyors 20 travel at a greater speed than central conveyor 19.

There are several ways this can be accomplished but the best mode contemplated by the inventor and carried out successfully is to construct the side rollers 32 and 33 of side conveyors 20 of a greater diameter than the rollers 36 and 37 of central conveyor 19. For example, satisfactory results have been obtained when the rollers 32 and 33 have been six inches in diameter and rollers 36 and 37 only four inches in diameter.

The tobacco plants are discharged off the rear end of middle conveyor 19 as that conveyor extends a greater distance rearwardly than side conveyor 20. Normally they are caught by workmen as they come off the conveyors.

Above the location of the engine 4 and to the rear of the machine thereof is located a shuttle drying assembly. This assembly is supported from frame 1 of the machine by the horizontally spaced posts 46 and the cross bar 47. A cradle 48 is supported above posts 46 and cross bar 47 in which are located the sticks or lath 49 upon which tobacco plants 50 are assembled as can be seen in FIG. 1.

Two sets of the drying shuttle assembly units are shown in the drawings so that two workmen can load tobacco plants 50 for drying as they come off the conveyors. Only one set will be described as both operate in the same manner.

The shuttle employed on the machine has two angular shaped tracks 51 which extend rearwardly from posts 46 and cross bar 47 and are supported therefrom. The two tracks 51 are laterally spaced from each other and both are outwardly bowed as illustrated in FIG. 2 to increase the space between them.

A bracket 52 is hung from each track 51 and rides on tracks 51 on upper and lower rollers 53. In addition a central roller 54 engages the wall of each track 51 to prevent the brackets from swinging sidewise.

A pulley 55 is located at the rear of the tracks 51 and a smaller pulley 56 at the forward end of tracks 51 and the pulleys are encircled by the cable 57. As illustrated in FIG. 2, the bracket 52 there shown at the rear of the shuttle is connected to cable 57 as at 58. At the forward end of the shuttle the forward bracket 52 as seen in FIG. 2 is connected to cable 57 as at 59. The connection 59 is illustrated in phantom in FIG. 5. A stop 60 is provided at the forward end of the shuttle for engagement with one of the brackets 52 in a forward position and similarly a stop 61 is provided at the rear end of the shuttle for engagement with one of the brackets 52 when in the rearward position.

The tobacco plants 50 are hung on the laths 49 to be supported for drying which are flat and a removable steel spear is placed on the forward end of each lath by a workman for insertion through the stalk of plant 50 when the latter is loaded onto the lath 49 as illustrated in FIG. 1 which shows a number of plants 50 assembled on a lath.

A lath 49 is manually loaded onto the bracket 52 at the rear of the machine by sliding one end of lath 49 between the offset ears 62 which are secured to the side of each bracket 52 until the lath engages stop 63 also secured to each bracket 52 at the rear. When the lath 62 is loaded into the rearmost bracket 52, the foremost bracket 52 supports a lath 49 which protrudes forwardly while being loaded by the workman with tobacco plants 50. This is accomplished by piercing the end of the stalk of the plant with the spear at the forward end of the lath and then forcing plant 50 rearwardly over lath 62. When the forward lath 49 is loaded with plants 50, the workman pushes it rearwardly and this automatically brings the rear bracket 52 attached to cable 57 forwardly with an unloaded lath 49 to the loading position. Thus when the lath 49 is being loaded with plants 50 at the forward position a workman standing on rear platform 8 is loading a lath 49 into the ears 62 of bracket 52 at the rear of the machine.

The bowed construction of the tracks 51 of the shuttle eliminates any contact by the leaves of plant 50 with the adjacent lath 49 and bracket 52 being moved forwardly on the other side of the shuttle. This also positions the point of each lath 49 at substantially the same forward position for loading of plants 50.

In addition, by locating the rear wheels 3 inwardly of the front wheels 2 as previously described, the rear wheels 3 are removed from beneath the tobacco plants 50 and the plants can then ride to the rear of the machine free of wheels 3.

The process is repeated with the brackets 52 carrying laths 49 shuttling back and forth on tracks 51.

The tobacco harvester of the invention is readily operated and is efficient in cutting tobacco plants and loading to the rear of the machine without injury to the leaves of the plant where they are hung to be removed for drying.

Various modes of carrying out the invention are contemplated as being within the scope of the following claims particularly pointing out and distinctly claiming the subject matter which is regarded as the invention.

I claim:

1. A machine for harvesting tobacco comprising, a frame supported on wheels for movement along a row of tobacco plants, power means supported on the frame and adapted to propel the machine on the wheels, tobacco plant cutting means at the front of said frame for rotation and independent operation by the power means, a plurality of conveyors supported at the front of the frame and actuated by the power means and disposed to receive the tobacco plants severed by the cutting means and transport them toward the rear of the machine, and said conveyors being provided in a trough-like configuration with a generally central relatively wide conveying surface and side conveyors located on opposite sides of the central conveyor and extending at an upward angle from the central conveyor to complete the trough-like configuration, driven means driving the side conveyors at a faster speed than the central conveyor to effect discharge of the tobacco plants to the rear of the machine without injury to the leaves, and reciprocable shuttle means supported on the frame at the rear of the machine to receive the cut plants and convey them to the rear for drying purposes.

2. A machine for harvesting tobacco as set forth in claim 1, and the means to effect driving of the side conveyors at a faster speed than the central conveyor being drive rollers which somewhat encircled by the central and side conveyors and drive the latter and the rollers of the side conveyors having a greater diameter than the roller which drives the central conveyor and the side conveyors extending forwardly of the central conveyor and slightly overlapping the outer portions of the central conveyor.

3. A machine for harvesting tobacco as set forth in claim 1, and the reciprocable shuttle means for loading and unloading tobacco being a pair of laterally spaced supporting members having an outwardly bowed configuration, a first bracket supported on one of the supporting members for movement thereover and a second bracket supported on the other supporting member for movement thereover, a cable attached to each bracket with the brackets being spaced longitudinally normally in forward and rear positions to manually move the brackets longitudinally of the supporting members, lath members removably secured to each bracket so that in the forward position of one of the brackets the lath secured to such bracket may be loaded with tobacco plants while a lath is being loaded onto the other bracket in the rear of the machine, and the bowed construction of the supporting members effecting passage of the tobacco plants moving to the rear on one lath without engagement with the other lath moving forwardly to be loaded with plants and thereby prevent injury to the leaves of the plant and also disposing the forward end of each lath in substantially the same position for loading of tobacco plants.

4. A machine for harvesting tobacco as set forth in claim 3, and there being a pair of laterally spaced front wheels and a pair of laterally spaced rear wheels supporting the machine on the ground with the rear wheels being driven from the power means and located laterally inwardly with respect to the front wheels to locate the rear wheels inside the shuttle means and thereby prevent contact of the wheels by tobacco plants as the plants are shuttled rearwardly of the machine.

5. A machine for harvesting tobacco as set forth in claim 3, and each bracket having a pair of offset ears with one ear longitudinally and laterally spaced from the adjacent ear to receive a flat end of a lath and secure it to the bracket, and a stop located at the rear end of the bracket to limit movement of the lath rearwardly within the ears.

6. A machine for harvesting tobacco as set forth in claim 1, and the plant cutting means being a pair of overlapping circular cutting discs with a knifelike circular edge bordering each disc and pivoted to the frame of the machine, and wiper blades secured to the frame of the machine at the forward end of the machine and overlying the discs to wipe off foreign material from the top of the cutter discs and prevent clogging of the cutter discs as they rotate.

7. A machine for harvesting tobacco plants as set forth in claim 6, and an independent sprocket and chain drive for the cutter discs which comprises a hydraulic motor driven from the power means and rotating a sprocket thereon, a generally large sprocket for each cutter disc pivoted to the frame to the rear of each disc and in longitudinal alignment therewith, a chain circling the hydraulic motor sprocket and the side portion of one of the large sprockets and encircling the other large sprocket to thereby rotate the large sprocket, a small sprocket located beneath each large sprocket and rotated by each respective large sprocket, a sprocket of a size comparable to said small sprockets secured to each circular cutter disc, and a chain encircling each respective small sprocket and a respective sprocket connected to a respective circular cutter disc to thereby rotate the circular cutter discs independently of the actuation of any other part of the machine, and the sprocket and chain drive construction for driving the discs preventing clogging of the sprockets and chains with dirt or the like.

* * * * *

UNITED STATES PATENT AND TRADEMARK OFFICE
CERTIFICATE OF CORRECTION

PATENT NO. : 4,180,965
DATED : January 1, 1980
INVENTOR(S) : MATT VEDVIG

It is certified that error appears in the above-identified patent and that said Letters Patent are hereby corrected as shown below:

Column 5, Line 41  After "which" insert ---are---
(Claim 2, Line 4)

*Signed and Sealed this*

*Thirtieth* Day of *September 1980*

[SEAL]

*Attest:*

SIDNEY A. DIAMOND

*Attesting Officer*     *Commissioner of Patents and Trademarks*